(12) United States Patent
Watanabe et al.

(10) Patent No.: US 7,684,200 B2
(45) Date of Patent: Mar. 23, 2010

(54) ELECTRONIC APPARATUS AND ELECTRONIC SYSTEM

(75) Inventors: Takuya Watanabe, Kobe (JP); Junichi Sawada, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 272 days.

(21) Appl. No.: 11/646,479

(22) Filed: Dec. 28, 2006

(65) Prior Publication Data
US 2008/0158794 A1    Jul. 3, 2008

(51) Int. Cl.
*H05K 7/16* (2006.01)

(52) U.S. Cl. .................. 361/727; 361/725; 361/726; 361/679.01; 361/679.02; 361/679.04; 361/679.07; 361/679.09; 361/679.12

(58) Field of Classification Search ........... 361/679, 361/681, 682, 683, 684, 685, 686, 724, 725, 361/726, 727, 679.01, 679.02, 679.04, 679.07, 361/679.09, 679.12, 679.21, 679.27, 679.41, 361/679.33, 679.34, 679.37, 679.38, 679.39, 361/679.29, 679.3; 701/207, 211, 214; 710/303
See application file for complete search history.

(56) References Cited

U.S. PATENT DOCUMENTS

| | | | |
|---|---|---|---|
| 4,178,319 A | 12/1979 | Chattha | |
| 4,542,421 A | 9/1985 | Fujibayashi | |
| 5,493,479 A | 2/1996 | Takahashi | |
| 5,510,957 A | 4/1996 | Takagi | |
| 5,537,673 A * | 7/1996 | Nagashima et al. | 455/346 |
| 5,592,389 A | 1/1997 | La Rue et al. | |
| 5,627,547 A | 5/1997 | Ramaswamy et al. | |
| 5,705,975 A * | 1/1998 | Serino et al. | 340/426.34 |
| 5,733,714 A | 3/1998 | McCulloch et al. | |
| 5,774,828 A | 6/1998 | Brunts et al. | |
| 5,794,164 A | 8/1998 | Beckert et al. | |
| 5,845,282 A | 12/1998 | Alley et al. | |
| 5,862,468 A | 1/1999 | Kim | |
| 5,917,435 A | 6/1999 | Kamiya et al. | |
| 5,941,933 A | 8/1999 | Miyake et al. | |
| 5,964,821 A | 10/1999 | Brunts et al. | |
| 5,999,126 A | 12/1999 | Ito | |

(Continued)

FOREIGN PATENT DOCUMENTS

DE    198 03 178 A1    7/1999

(Continued)

OTHER PUBLICATIONS

U.S. Appl. No. 11,645,629, filed in the U.S.P.T.O. on Dec. 27, 2006.

(Continued)

*Primary Examiner*—Jinhee J Lee
*Assistant Examiner*—Hoa C Nguyen
(74) *Attorney, Agent, or Firm*—Oliff & Berridge, PLC (57) ABSTRACT

An electronic apparatus includes: a main body; and a front face panel movably supported to cover a front face of the main body or to expose at least a portion of the front face thereof, and the front face panel is provided with a housing portion detachably retaining a portable apparatus; and the front face side of the main body is provided with an insertion/ejection slot for inserting or ejecting a memory medium.

5 Claims, 11 Drawing Sheets

U.S. PATENT DOCUMENTS

| | | |
|---|---|---|
| 6,009,355 A | 12/1999 | Obradovich et al. |
| 6,023,290 A | 2/2000 | Seita |
| 6,055,478 A | 4/2000 | Heron |
| 6,091,956 A | 7/2000 | Hollenberg |
| 6,093,977 A | 7/2000 | Fujita et al. |
| 6,119,060 A | 9/2000 | Takayama et al. |
| 6,125,326 A | 9/2000 | Ohmura et al. |
| 6,136,507 A | 10/2000 | Morigaki |
| 6,148,253 A | 11/2000 | Taguchi et al. |
| 6,150,925 A | 11/2000 | Casazza |
| 6,163,079 A | 12/2000 | Miyazaki et al. |
| 6,202,008 B1 | 3/2001 | Beckert et al. |
| 6,208,932 B1 | 3/2001 | Ohmura et al. |
| 6,243,645 B1 | 6/2001 | Moteki et al. |
| 6,303,266 B1 | 10/2001 | Okino et al. |
| 6,405,049 B2 | 6/2002 | Herrod et al. |
| 6,417,786 B2 | 7/2002 | Learman et al. |
| 6,421,606 B1 | 7/2002 | Asai et al. |
| 6,653,049 B2 | 11/2003 | Pavelchek et al. |
| 6,681,176 B2 * | 1/2004 | Funk et al. .............. 701/207 |
| 6,701,161 B1 * | 3/2004 | Wendling ............. 455/556.1 |
| 6,791,844 B2 | 9/2004 | Tobishima et al. |
| 6,803,168 B1 | 10/2004 | Padmanaban et al. |
| 6,816,783 B2 | 11/2004 | Hashima et al. |
| 6,993,615 B2 | 1/2006 | Falcon |
| 7,006,845 B2 | 2/2006 | Simon |
| 7,016,986 B2 | 3/2006 | Fasolt |
| 7,062,378 B2 | 6/2006 | Krull et al. |
| 7,079,863 B2 | 7/2006 | Chikaishi |
| 7,117,286 B2 | 10/2006 | Falcon |
| 7,184,003 B2 | 2/2007 | Cupps et al. |
| 7,215,950 B2 | 5/2007 | Mazzara, Jr. et al. |
| 7,216,242 B2 | 5/2007 | Glass et al. |
| 7,222,207 B2 | 5/2007 | Falcon |
| 2002/0024597 A1 | 2/2002 | Arai et al. |
| 2002/0068549 A1 | 6/2002 | Tendler |
| 2002/0137541 A1 * | 9/2002 | Lepley et al. ............... 455/556 |
| 2002/0152027 A1 * | 10/2002 | Allen ....................... 701/213 |
| 2003/0022624 A1 | 1/2003 | Sato |
| 2003/0103634 A1 | 6/2003 | Ito |
| 2003/0215736 A1 | 11/2003 | Oberlander et al. |
| 2004/0058656 A1 | 3/2004 | Chikaishi |
| 2004/0204159 A1 | 10/2004 | Van Bosch |
| 2004/0247280 A1 | 12/2004 | Izawa |
| 2005/0139731 A1 * | 6/2005 | Park et al. .................. 248/27.3 |
| 2006/0031617 A1 * | 2/2006 | Falcon ....................... 710/303 |
| 2006/0211256 A1 | 9/2006 | Takei et al. |
| 2008/0130206 A1 | 6/2008 | Itoh |
| 2008/0161047 A1 | 7/2008 | Witkowski et al. |

FOREIGN PATENT DOCUMENTS

| | | |
|---|---|---|
| EP | 0 507 990 A1 | 10/1992 |
| EP | 0 658 011 A | 6/1995 |
| EP | 1 251 034 A2 | 10/2002 |
| EP | 1 727 019 A1 | 11/2006 |
| GB | 2 287 501 A | 9/1995 |
| GB | 2 336 489 A | 10/1999 |
| JP | U-57-204770 | 12/1982 |
| JP | Y-63-018184 | 5/1988 |
| JP | A 04-238218 | 8/1992 |
| JP | A 07-074479 | 3/1995 |
| JP | A-07-132779 | 5/1995 |
| JP | A-07-156719 | 6/1995 |
| JP | A 08-007977 | 1/1996 |
| JP | A 08-260794 | 10/1996 |
| JP | 08-318792 | 12/1996 |
| JP | A 08-318792 | 12/1996 |
| JP | A 10-16654 | 1/1998 |
| JP | A 10-103999 | 4/1998 |
| JP | A 10-135669 | 5/1998 |
| JP | A 10-199220 | 7/1998 |
| JP | A 11-289173 | 10/1999 |
| JP | 2000-311029 A | 11/2000 |
| JP | A 2001-015936 | 1/2001 |
| JP | A-2001-052473 | 2/2001 |
| JP | 2001-141471 A | 5/2001 |
| JP | A 2001-239895 | 9/2001 |
| JP | A-2002-74922 | 3/2002 |
| JP | A-2002-181555 | 6/2002 |
| JP | A-2002-267461 | 9/2002 |
| JP | A 2002-328026 | 11/2002 |
| JP | A 2003-003554 | 1/2003 |
| JP | 2003-035554 A | 2/2003 |
| JP | 2003-037514 A | 2/2003 |
| JP | A 2003-166848 | 6/2003 |
| JP | A 2003-521825 | 7/2003 |
| JP | A-2003-308686 | 10/2003 |
| JP | 2003-315065 A | 11/2003 |
| JP | A 2004-234794 | 8/2004 |
| JP | 2005-173653 A | 6/2005 |
| JP | A 2005-524570 | 8/2005 |
| KR | 10-2001-0112146 A | 12/2001 |
| KR | 10-2003-0071743 A | 9/2003 |
| KR | 10-2004-0061642 A | 7/2004 |
| KR | 10-2005-0017296 A | 2/2005 |
| KR | 10-2006-0030344 A | 4/2006 |
| KR | 2006-128470 A | 12/2006 |
| WO | WO 98/39852 | 9/1998 |
| WO | WO 99/38728 | 8/1999 |
| WO | WO-2004/092840 A1 | 10/2004 |
| WO | WO 2006/130784 A2 | 12/2006 |

OTHER PUBLICATIONS

U.S. Appl. No. 11,645,642, filed in the U.S.P.T.O. on Dec. 27, 2006.
U.S. Appl. No. 11,645,628, filed in the U.S.P.T.O. on Dec. 27, 2006.
U.S. Appl. No. 11,646,539, filed in the U.S.P.T.O. on Dec. 28, 2006.
U.S. Appl. No. 11,646,477, filed in the U.S.P.T.O. on Dec. 28, 2006.
U.S. Appl. No. 11,646,566, filed in the U.S.P.T.O. on Dec. 28, 2006.
U.S. Appl. No. 11,645,672, filed in the U.S.P.T.O. on Dec. 27, 2006.
U.S. Appl. No. 11,646,557, filed in the U.S.P.T.O. on Dec. 28, 2006.
U.S. Appl. No. 11,646,478, filed in the U.S.P.T.O. on Dec. 28, 2006.
U.S. Appl. No. 11,646,558, filed in the U.S.P.T.O. on Dec. 28, 2006.
U.S. Appl. No. 11,646,498, filed in the U.S.P.T.O. on Dec. 28, 2006.
U.S. Appl. No. 11,646,538, filed in the U.S.P.T.O. on Dec. 28, 2006.
M. Mukasa. "Detachable-Panel Connectors Respond to Needs for Anti-Theft Designs," JEE Journal of Electronic Engineering 30, Feb. 1993, No. 314, Tokyo, Japan.

* cited by examiner

ELECTRONIC APPARATUS AND ELECTRONIC SYSTEM

BACKGROUND OF THE INVENTION

1. Field of the Invention

This invention relates to an electronic apparatus and electronic system.

2. Description of the Related Art

As conventional navigation apparatuses, there are widely known small-sized portable navigation apparatuses with simplified structure and portability (hereinafter, referred to as Portable Navi), also known as personal navigation device; and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, the navigation apparatuses with portability of the Portable Navi and high-accuracy guide function of the in-vehicle navigation apparatus have been studied.

Japanese Patent Application Publication No. 8-318792, Japanese Patent Application Publication No. 2002-328026, Japanese Patent Application Publication No. 2005-524570, and Japanese Patent Application Publication No. 2001-239895 disclose a configuration where a navigation portion can be detached from an in-vehicle apparatus mounted in a vehicle. By removing the navigation portion from the in-vehicle apparatus, the navigation portion can be used as a Portable Navi of a single unit.

Also, as disclosed in Japanese Patent Application Publication No. 2003-166848, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

In an in-house vehicle apparatus disclosed in U.S. Patent Application Publication No. 2002/0152027, a portion to which the navigation apparatus is detachably provided and an insertion/ejection slot for inserting or ejecting a CD (Compact Disk) are adjacently arranged at a front face of the in-vehicle apparatus. For this reason, it is difficult to reduce the size of the in-vehicle apparatus.

In addition, since the size of CDs is regulated, the size of the insertion/ejection slot cannot be changed. Therefore, in order to reduce the size of the in-vehicle apparatus, the portion to and from which the navigation apparatus is attached and detached needs to be made smaller. However, the navigation apparatus needs to be downsized, leading to the possibility that a navigation screen cannot be seen very well.

SUMMARY OF THE INVENTION

The present invention has been made in view of the above circumstances and provides a downsized electronic apparatus and an electronic system having the same.

According to one aspect of the present invention, there is provided an electronic apparatus including: a main body; and a front face panel movably supported to cover a front face of the main body or to expose at least a portion of the front face thereof, and the front face panel is provided with a housing portion detachably retaining a portable apparatus; and the front face side of the main body is provided with an insertion/ejection slot for inserting or ejecting a memory medium.

With this configuration, the housing portion and the insertion/ejection slot are not provided in an identical plane, thereby reducing the size of the electronic apparatus. In particular, even if the housing portion occupies a great portion of the front face panel, it is possible to suppress the increase in size of the electronic apparatus. Accordingly, a large-sized portable apparatus is detachably retained, and in addition, the electronic apparatus can be downsized.

According to another aspect of the present invention, there is provided an electronic system including: a portable apparatus; and an electronic apparatus detachably retaining the portable apparatus, the electronic apparatus including: a main body; and a front face panel movably supported to cover a front face of the main body or to expose at least a portion of the front face thereof, and the front face panel is provided with a housing portion detachably retaining a portable apparatus; and the front face side of the main body is provided with an insertion/ejection slot for inserting or ejecting a memory medium.

BRIEF DESCRIPTION OF THE DRAWINGS

Exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

An exemplary embodiment of the present invention will be described with reference to the drawings. However, the technical scope of the present invention is not limited to the exemplary embodiments described below but instead, includes all equivalents to the terms of the claim described.

Figure 1A:
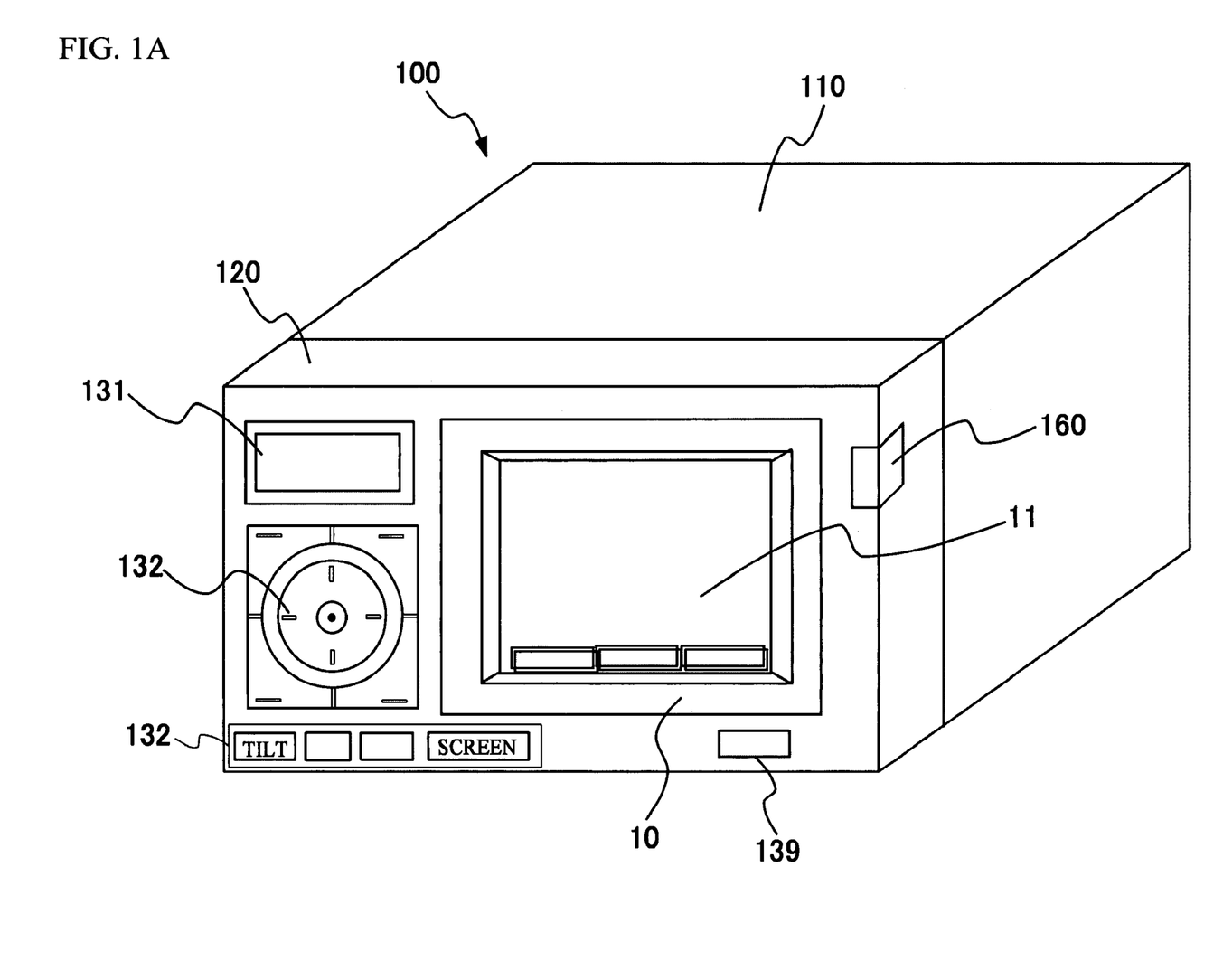
FIG. 1A and FIG. 1B are schematic views of an in-vehicle system.
Figure 1B:
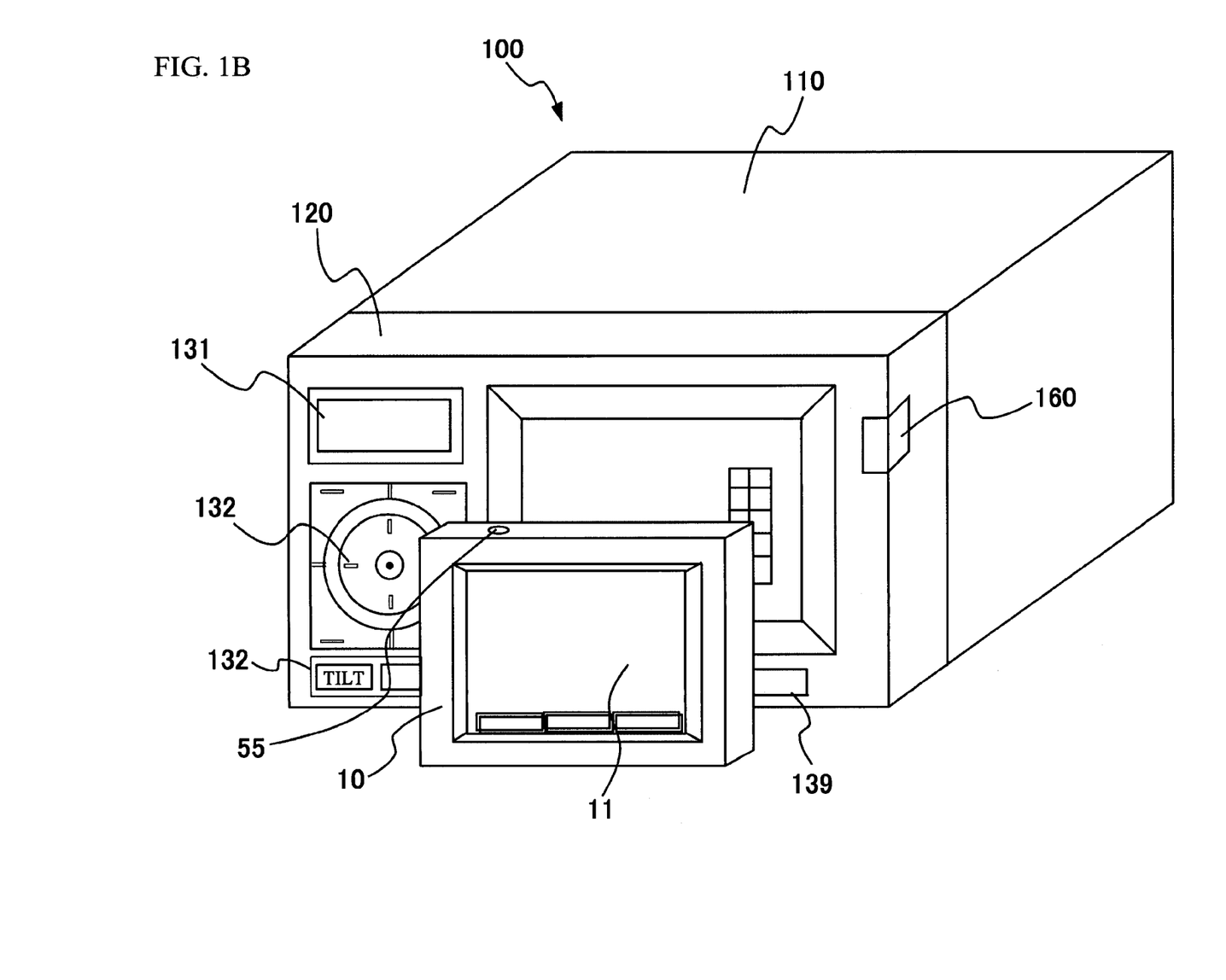

FIG. 1A and FIG. 1B show exterior views of an in-vehicle system 1, as an example of an electronic system. As shown in FIG. 1A and FIG. 1B, the in-vehicle system 1 is composed of: an in-vehicle apparatus 100 (electronic apparatus); and a portable apparatus 10 (portable apparatus) with navigation capabilities. The portable apparatus 10 can be used after being attached at a front face portion 120 of the in-vehicle apparatus 100, as shown in FIG. 1A, and can be also used after being detached from the in-vehicle apparatus 100, as shown in FIG. 1B.

The in-vehicle apparatus 100 is capable of playing radio broadcasting or playing music data recorded on a memory medium such as a CD or the like, and the in-vehicle apparatus 100 includes: an in-vehicle apparatus main body 110 having a CD player and a CD insertion/ejection slot; and the front face portion 120 having a display portion 131 and an operating portion (main operating portion) 132.

The portable apparatus 10 has navigation capabilities of searching for a guiding path to a destination and displaying the searched guiding path over a map.

Figure 2:
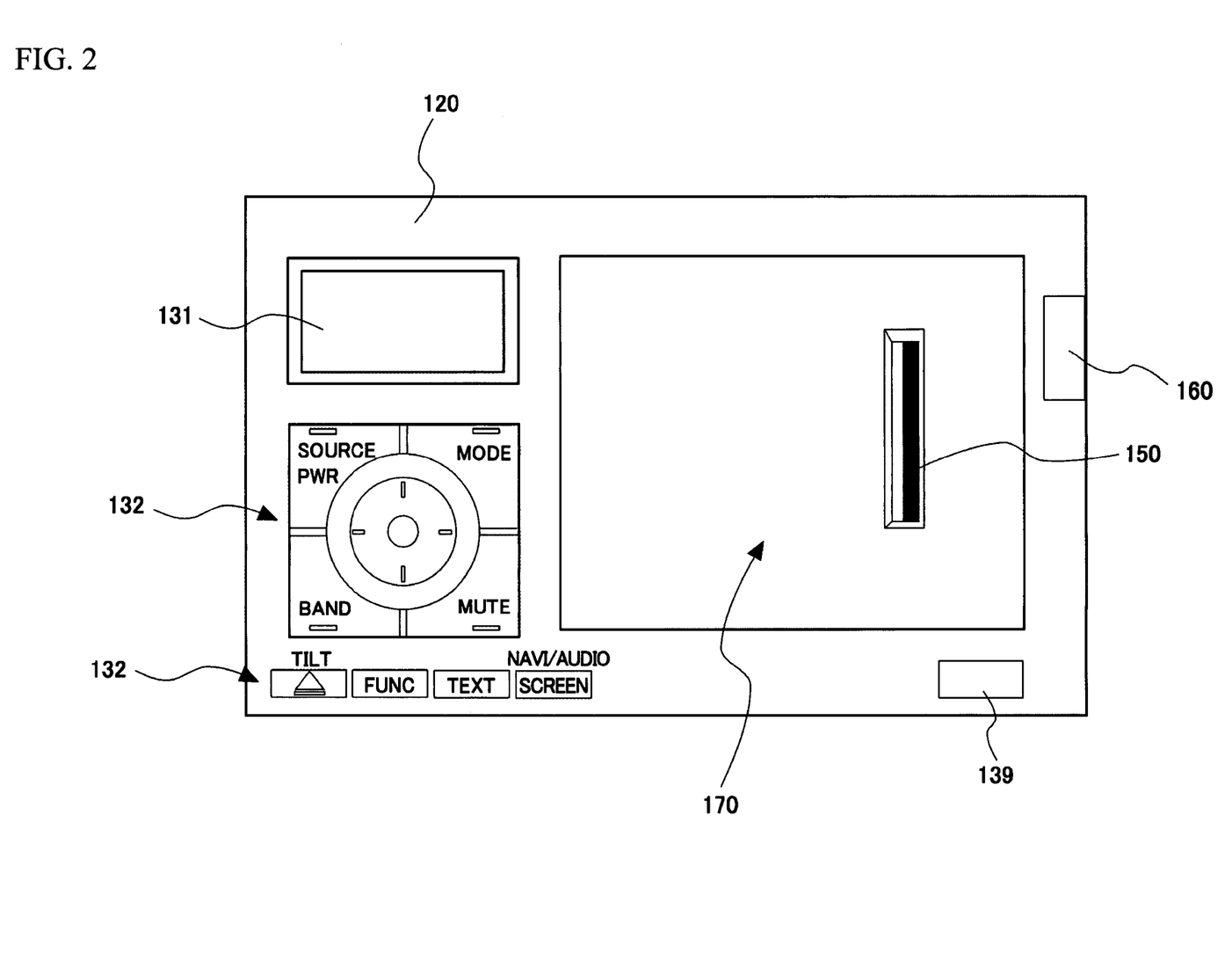
FIG. 2 is a schematic view of a portable apparatus taken out of an in-vehicle apparatus.

FIG. 2 shows the portable apparatus 10 taken out of the in-vehicle apparatus 100. There is provided a housing portion 170 in which a recess portion is defined for attaching the portable apparatus 10, at the front face portion 120 of the in-vehicle apparatus 100. The housing portion 170 is provided with: a connector 150 (housing portion side connector) for electrically coupling the in-vehicle apparatus 100 and the portable apparatus 10; and a lock mechanism (not shown) for securing the portable apparatus 10 to the front face portion 120. When a detach button 160 (detach operating portion) provided at the front face portion 120 is operated, a lock mechanism, not shown, is unlocked and the portable apparatus 10 is detachable from the in-vehicle apparatus 100.

Figure 3:
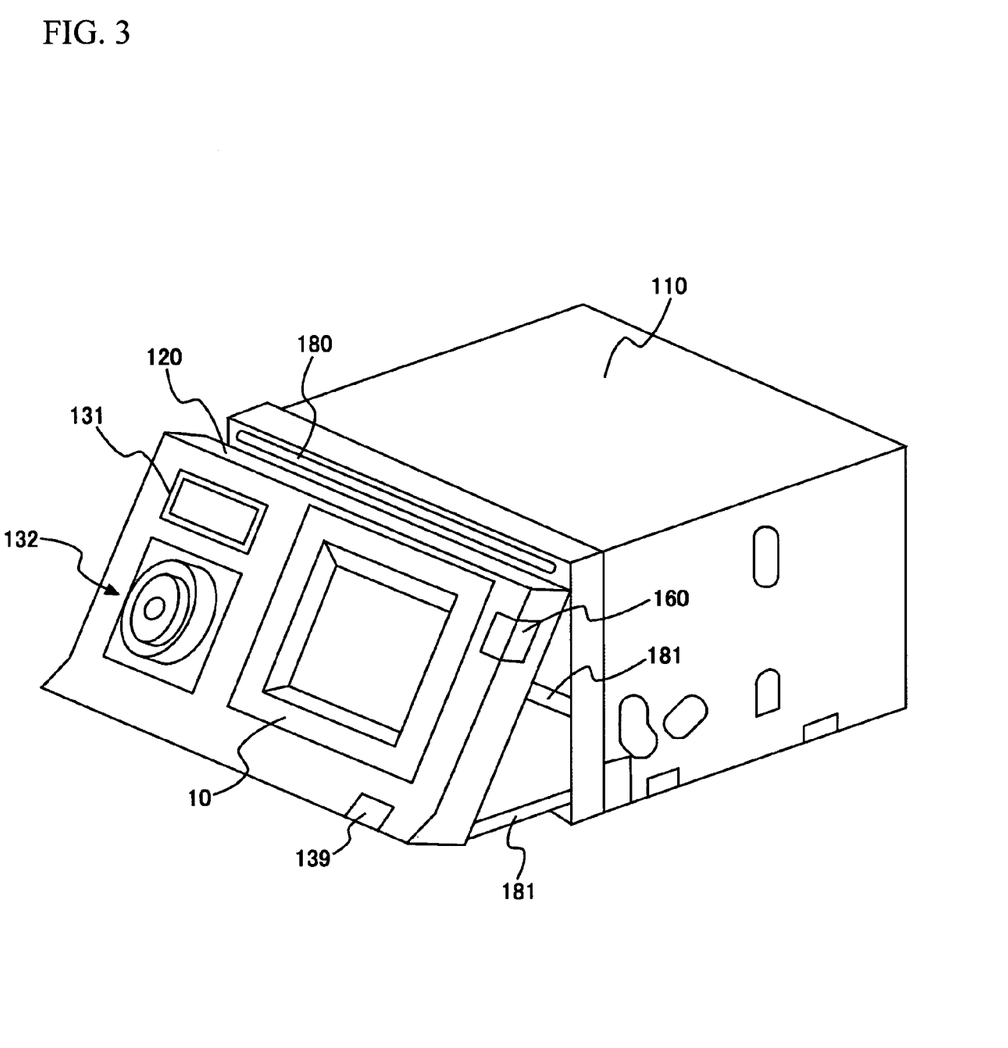
FIG. 3 is a schematic view showing a state of tilting a front face portion against the main body of the in-vehicle apparatus to expose a CD insertion/ejection slot.

FIG. 3 shows a state of tilting the front face portion 120 against the in-vehicle apparatus main body 110 to expose a CD insertion/ejection slot 180.

By driving a slider 181 shown in FIG. 3 with a drive mechanism, not shown, the front face portion 120 can be tilted against the in-vehicle apparatus main body 110. By tilting operation, the CD insertion/ejection slot 180 provided in the in-vehicle apparatus main body 110 is exposed, so a CD can be inserted or ejected. There is provided an operation button (a tilt/eject button 132a shown in FIG. 6), at the front face portion 120 of the in-vehicle apparatus 100, and a tilt angle can be set according to the operation of the button.

Figure 4:
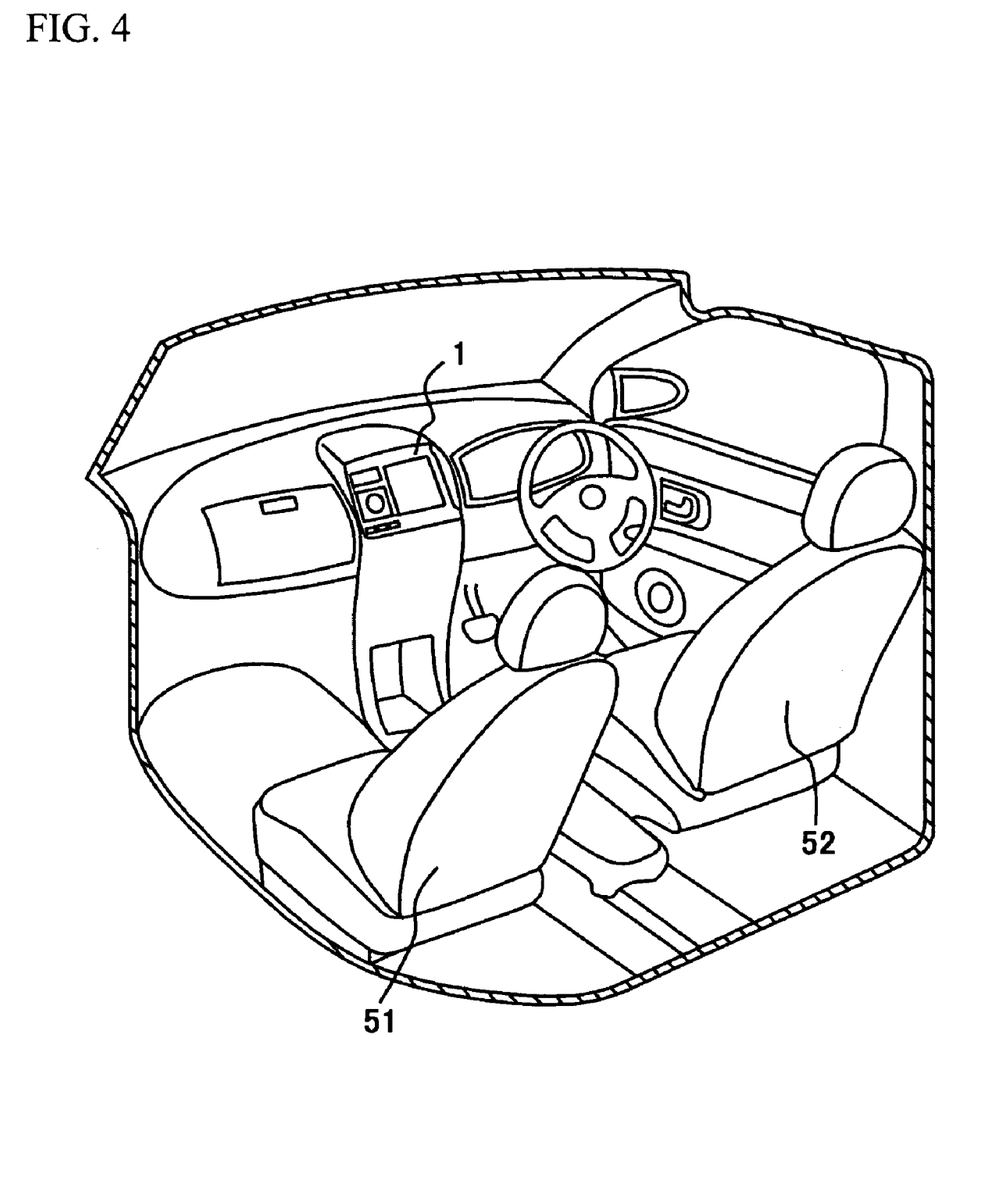
FIG. 4 illustrates an example of mounting the in-vehicle system in a vehicle.

FIG. 4 illustrates an example of mounting the in-vehicle system 1 in a vehicle.

The in-vehicle system 1 is disposed in a dashboard portion substantially in the middle of a front-passenger's seat 51 and a driver's seat 52, as shown in FIG. 4, for example.

Here, a GPS (Global Positioning System) antenna, not shown, of a GPS information receiver 133 is located on the dashboard or attached at an inner side of a front glass.

Figure 5:
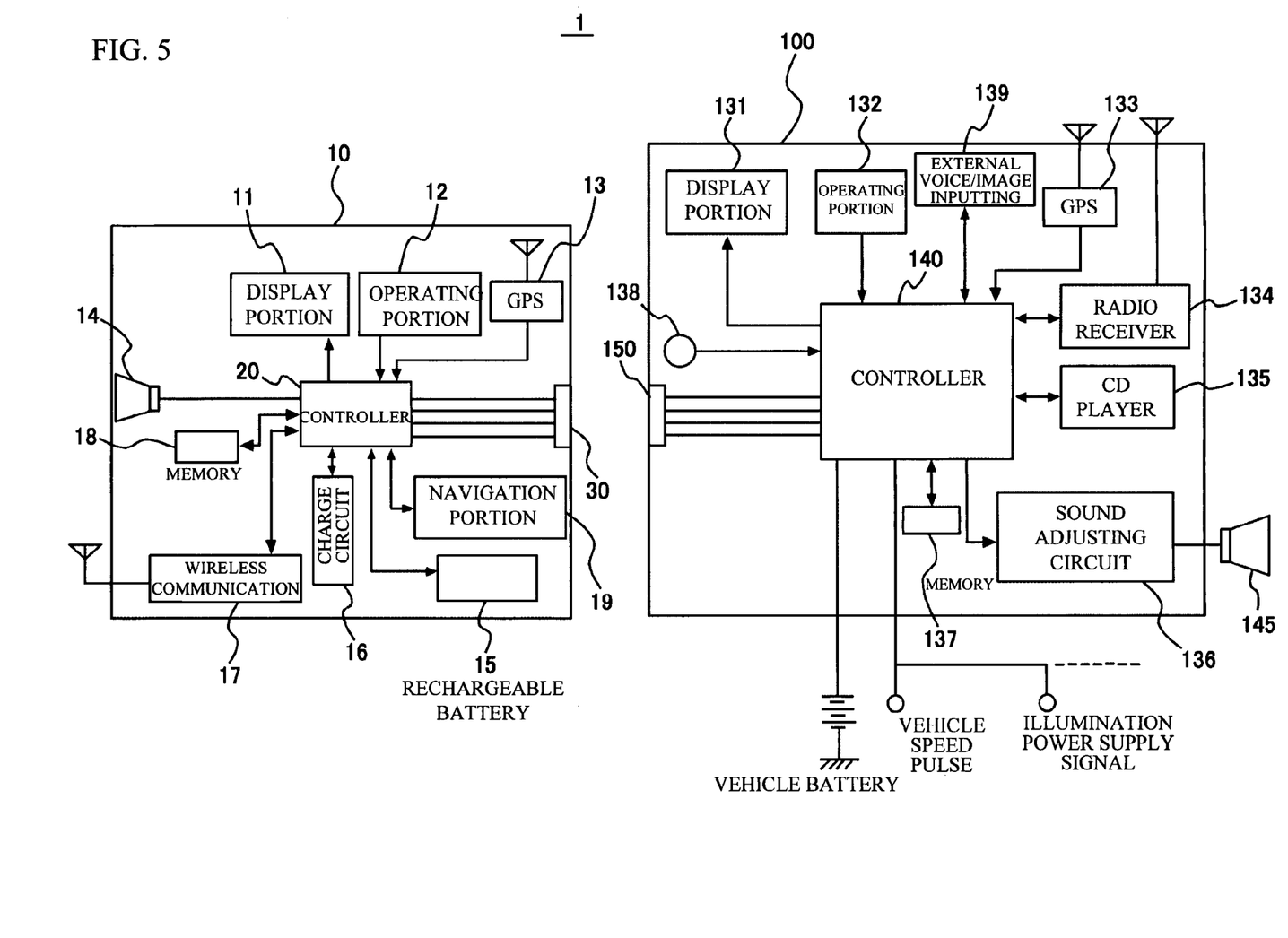
FIG. 5 is a block diagram showing a schematic configuration of the in-vehicle system.

FIG. 5 is a block diagram showing a schematic configuration of the in-vehicle system 1.

The in-vehicle apparatus 100 and the portable apparatus 10 are electrically connected by connectors. The connector 150 is provided at the in-vehicle apparatus 100 side, and a connector 30 is provided at the portable apparatus 10. By connecting the connectors 150 and 30, various signals are sent and received between the in-vehicle apparatus 100 and the portable apparatus 10 to function as the in-vehicle system 1. The connectors 150 and 30 are respectively provided with power supply terminals for supplying power to the portable apparatus 10 from the battery of the vehicle. When the portable apparatus 10 is connected to the in-vehicle apparatus 100 and the power is supplied to the in-vehicle apparatus 100, the power is also supplied to the portable apparatus 10 via the power supply terminals.

The in-vehicle apparatus 100 is provided with: the display portion 131; the operating portion 132; the GPS information receiver 133; a radio receiver 134; a CD player 135; a sound adjusting circuit 136; a memory 137; a microphone 138; an external voice/image inputting portion 139; a controller 140; and the connector 150. The in-vehicle apparatus 100 is activated by supplying the power from the battery of the vehicle, when the engine key is positioned at ACC or IG.

Hereinafter, the function of each part will be described in detail.

The display portion 131 is provided with a liquid crystal panel and a backlight, and displays a frequency of the received broadcasting, a track number of music being played, a music name being played, and the like, according to the 13-segment display.

Figure 6:
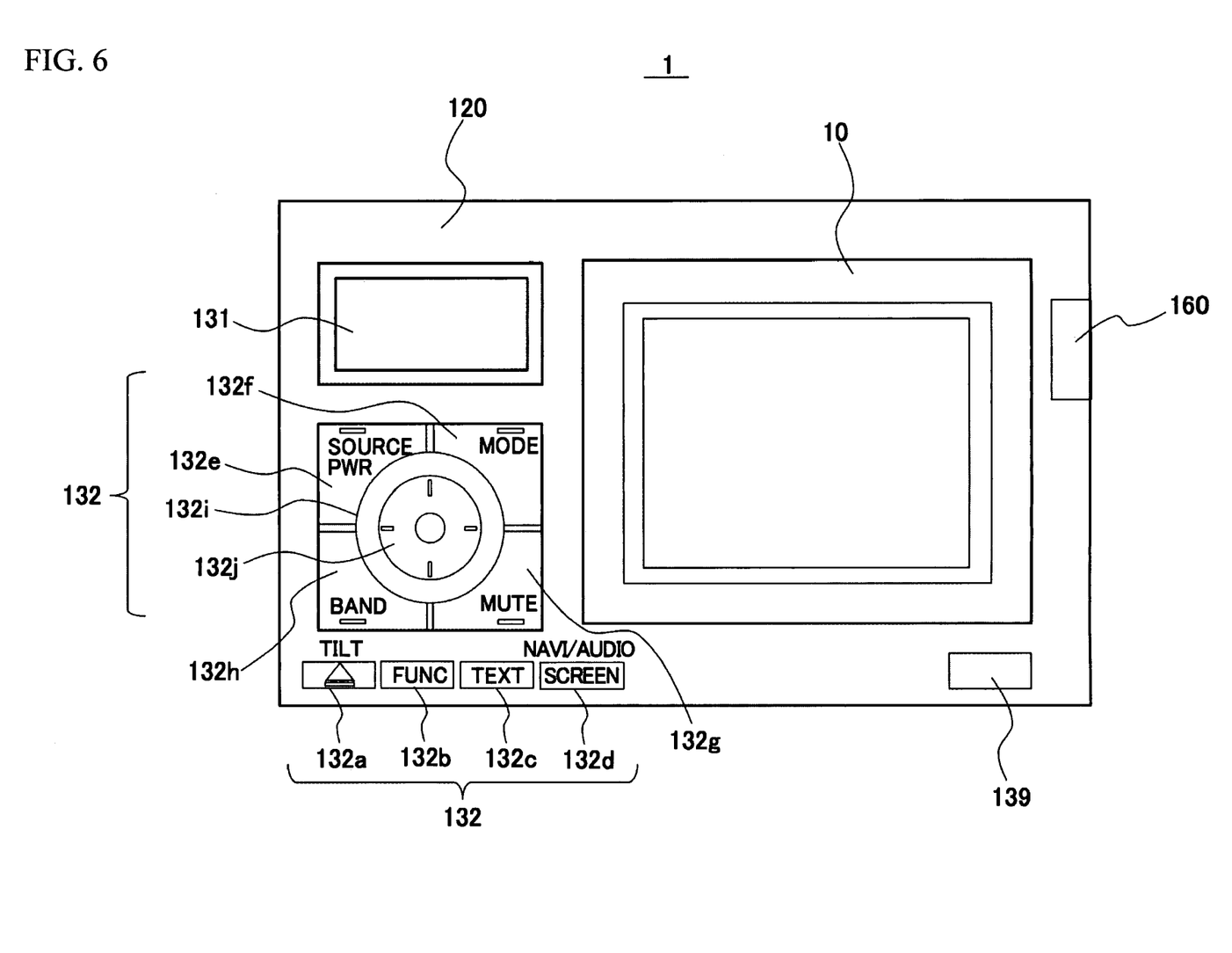
FIG. 6 is a front face view of the front face portion.

The operating portion 132 is provided for selectively changing the operation mode of the in-vehicle apparatus 100, and for operating in various modes that have been changed. The operating portion 132 is provided with a group of buttons including: the tilt/eject button 132a; a function (represented as FUNC in the drawing)/AF button 132b; a TEXT button 132c; a SCREEN button 132d; a SOURCE/PWR button 132e; a MODE button 132f; a MUTE button 132g; a BAND change button 132h; a rotary button 132i; a cross key/enter key button 132j, as shown in FIG. 6.

Here, a description will be given of switching the display between the portable apparatus 10 and the in-vehicle apparatus 100.

Firstly, the in-vehicle apparatus 100 turns on when the SOURCE/POWER button 132e of the in-vehicle apparatus 100 is pushed. When the SOURCE/POWER button 132e is pushed for a short period of time while the portable apparatus 10 is on, the source is changed to the CD playing or radio broadcasting. At this time, the information on the selected source is displayed on the display portion 131 of the in-vehicle apparatus 100, and the navigation image is displayed on a display portion 11 of the portable apparatus 10, without relation to the source.

Next, when the SCREEN button 132d is pushed, the navigation image displayed on the display portion 11 of the portable apparatus 10 can be changed to an image corresponding to the source selected at the in-vehicle apparatus 100.

Figure 7A:
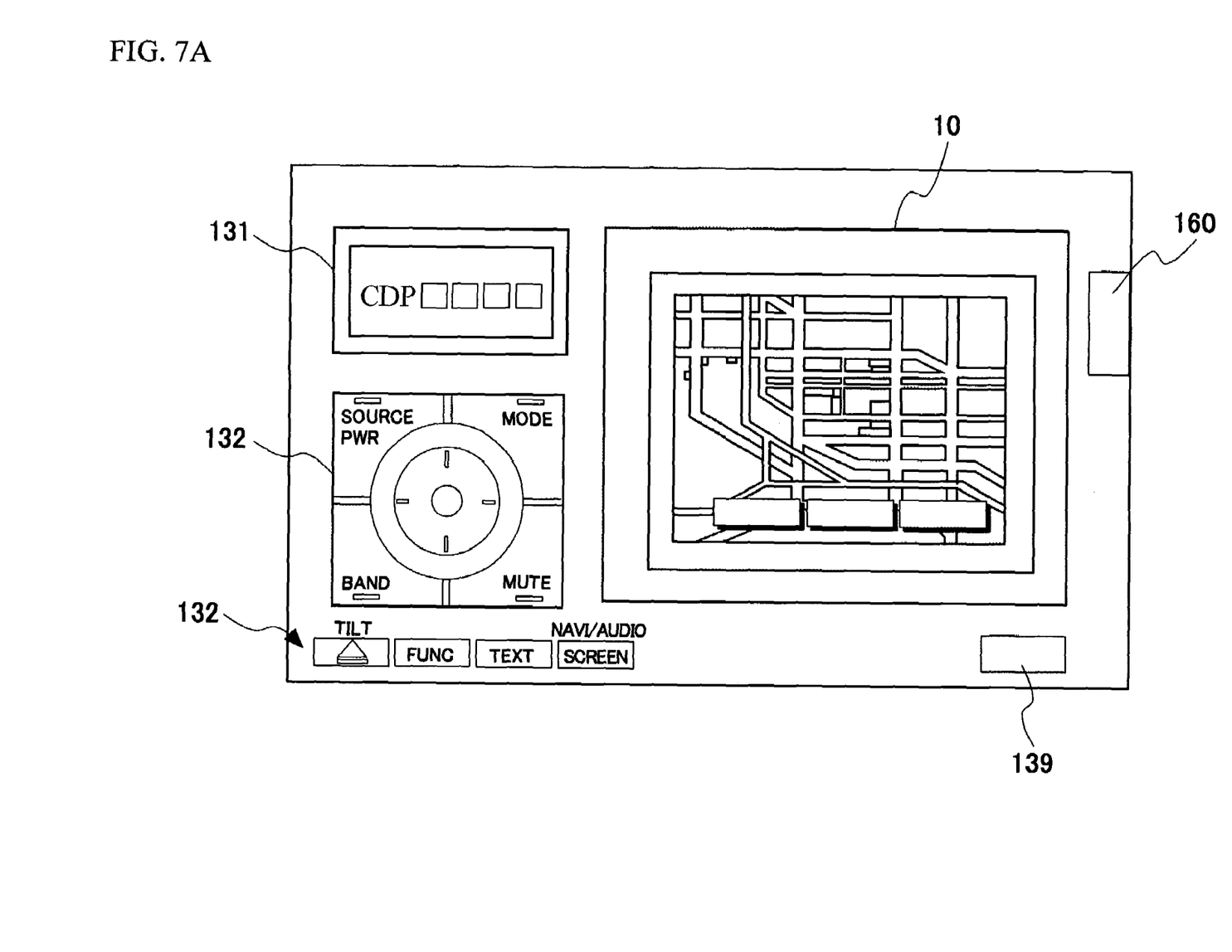
FIG. 7A through FIG. 7C are explanatory views of the operation of the in-vehicle apparatus and display examples of the portable apparatus in accordance therewith.

FIG. 7A shows a state where the portable apparatus 10 is attached to the in-vehicle apparatus 100 while the CD is being played and a navigation image is being displayed on the portable apparatus 10.

When the SOURCE/POWER button 132e is pushed in the state of FIG. 7A and the source is changed from the CD playing to the radio broadcasting, the information on the radio source is displayed on the display portion 131. Also, the navigation image remains being displayed on the display portion 11 of the portable apparatus 10.

Figure 7B:
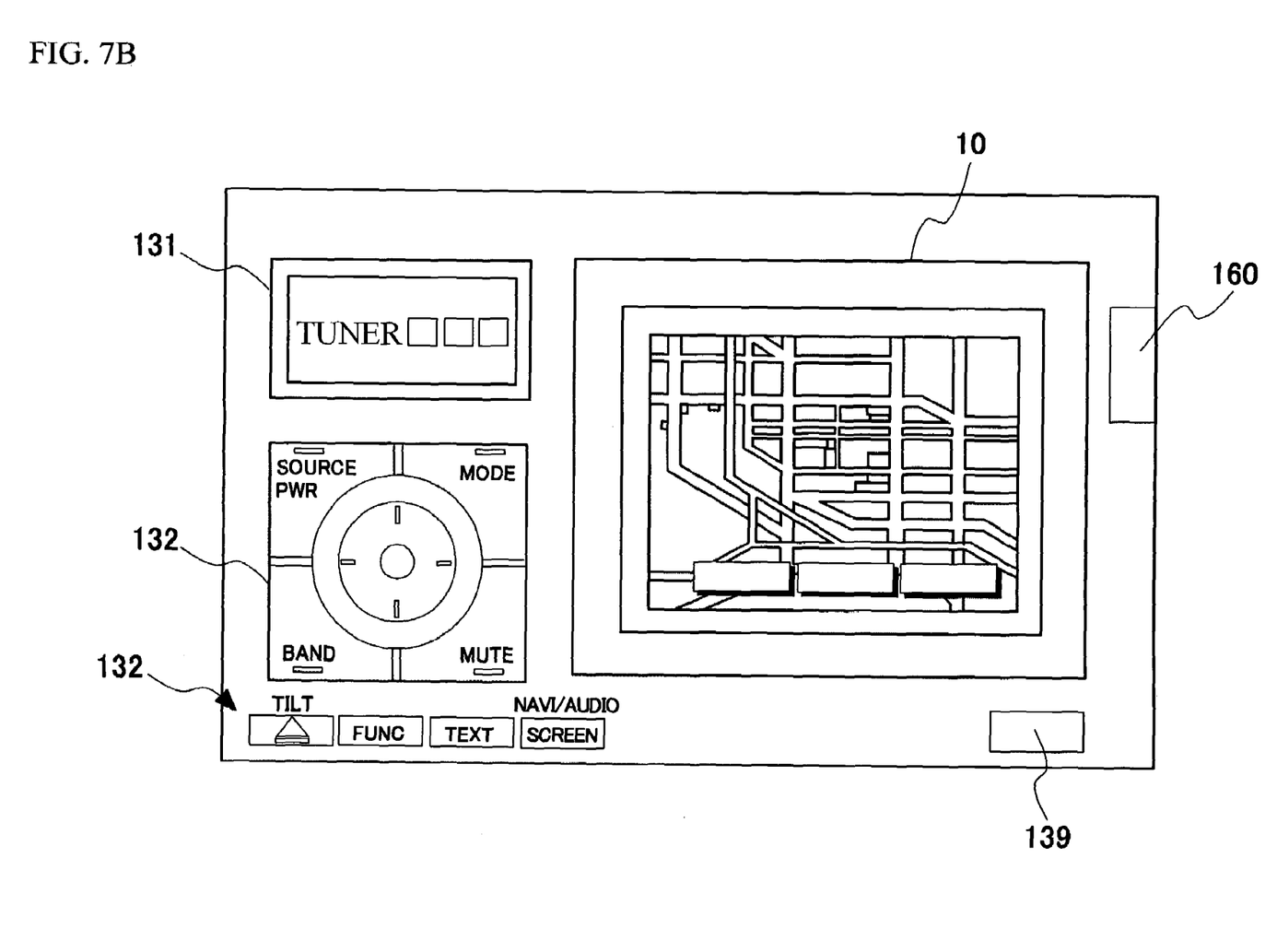
Figure 7C:
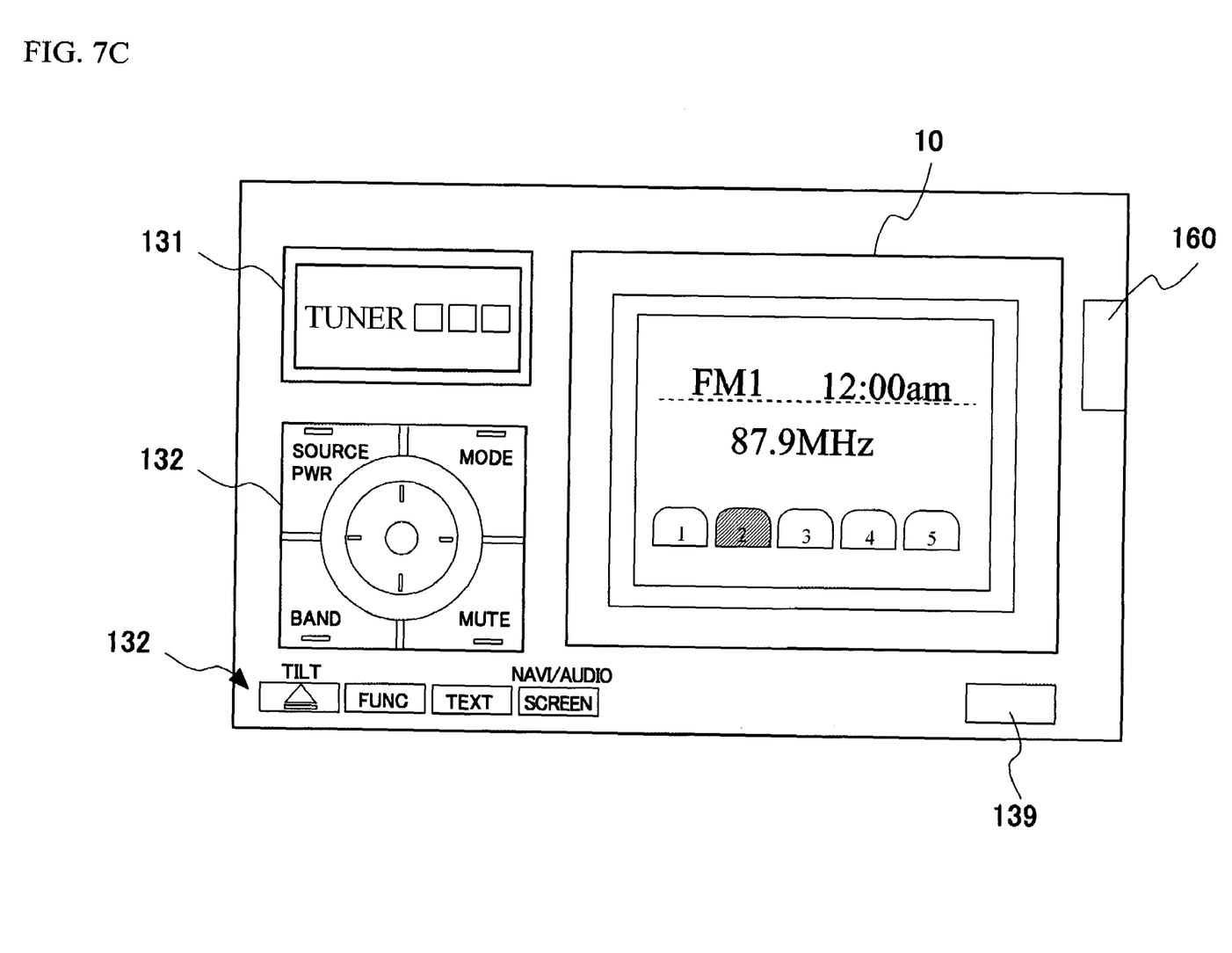

Then, when a user pushes the SCREEN button 132d, the image corresponding to the source being processed by the in-vehicle apparatus 100 is displayed on the display portion 11 of the portable apparatus 10, as shown in FIG. 7C (radio image is displayed in FIG. 7C). A touch panel, described later, is provided in the display portion 11 of the portable apparatus 10. A user is capable of operating the source currently being processed, by selecting the operation buttons displayed on the display portion 11.

In addition, when the SCREEN button 132d is pushed with the radio screen being displayed on the display portion 11, it is possible to return to the navigation image from the radio image, as shown in FIG. 7B. When the portable apparatus 10 is removed from the in-vehicle apparatus 100, the operation of the SCREEN button 132d is invalid.

Furthermore, when a USB (Universal Serial Bus) or the like is connected to the external voice/image inputting portion 139 with the portable apparatus 10 removed from the in-vehicle apparatus 100, it is possible to prevent the change to the USB source, even if the SOURCE/POWER button 132e is pushed.

Referring back to FIG. 5, the GPS information receiver 133 includes a GPS antenna and a tuner, and receives GPS signals from a satellite. The GPS signal received by the GPS information receiver 133 is output through the controller 140, the connector 150, the connector 30, and a controller 20, to a navigation portion 19 of the portable apparatus 10, and then the position of the vehicle in which the in-vehicle apparatus 100 having the portable apparatus 10 therein is determined based on the GPS signal.

Herein, the GPS signal may be output to the navigation portion of the portable apparatus 10 through the controller 140, instead of through the controller 20. Alternatively, the GPS information receiver 133 may be composed of the GPS antenna only, so that the GPS signal received by the GPS antenna may be output to the tuner of a GPS information receiver 13, described later, without through the controller 140 or the controller 20. Further alternatively, the GPS signal may be output through the controller 20 to the tuner of the GPS information receiver 13 without through the controller 140. Various changes may be made as necessary.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140.

The CD player 135 reads the data stored in the CD, reproduces the data on a speaker 145, and outputs the reproduced signal to the controller 140.

Herein, the demodulated signal output from the radio receiver 134 may be output to the sound adjusting circuit 136, described later, without through the controller 140.

The sound adjusting circuit 136 implements signal processing such as volume control or tone control on the sound signal received or demodulated by the radio receiver 134 or the sound signal reproduced by the CD player 135, and then outputs the processed signal to the speaker 145.

The memory 137 may be composed of a RAM (Random Access Memory) from which data is readable and into which data is writable, and temporarily stores information necessary for control.

The microphone 138 is provided for hands-free communication, and takes in user's voices in the vehicle.

The external voice/image inputting portion 139 is provided with a connection terminal with an external device such as a USB memory, portable audio device, or the like so that an audio signal or data from the external device may be input. The external voice/image inputting portion 139 then sends the signal or data to the controller 140, and outputs the audio signal, data, or the like to the external device connected.

The controller 140 controls the radio receiver 134, the CD player 135, and the sound adjusting circuit 136, according to the operation by means of the operating portion 132.

Also, the controller 140 outputs various signals through the connector 150 to the portable apparatus 10, and controls the in-vehicle apparatus 100 on the basis of the various signals input from the portable apparatus 10. For example, the controller 140 outputs the GPS signal received by the GPS information receiver 133 or the audio signal input through the microphone 138, to the portable apparatus 10 by way of the connector 150.

Here, the audio signal input through the microphone 138 may be output to the portable apparatus 10 by way of the connector 150, without through the controller 140.

In addition, the voice on communication over a mobile phone connected to the portable apparatus 10 is input through the connector 150 into the controller 140, and is then output through the sound adjusting circuit 136 to the speaker 145.

Furthermore, the controller 140 acquires an operation signal corresponding to a menu image of various modes displayed on the display portion 11 of the portable apparatus 10, from the controller 20 of the portable apparatus 10, and then controls the radio receiver 134 and the CD player 135.

Also, the power is supplied to the controller 140 from the battery mounted in the vehicle. When the portable apparatus 10 is connected, the controller 140 outputs the power supplied from the battery to the portable apparatus 10.

Here, a vehicle speed pulse and an illumination power supply signal are input into the controller 140 from a vehicle. The controller 140 transfers such input vehicle speed pulse to the controller 20 of the portable apparatus 10.

Meanwhile, the vehicle speed pulse may be configured not to be input into the in-vehicle apparatus 100.

Next, a description will be given of the portable apparatus 10. The portable apparatus 10 is provided with: the display portion 11; an operating portion 12; the GPS information receiver 13; a speaker 14; a rechargeable battery 15; a charge circuit 16; a wireless communication transmitter/receiver 17; a memory 18; the navigation portion 19; the controller 20; and the connector 30.

Hereinafter, functions of the components will be described in detail.

The display portion 11 is provided with a liquid crystal panel and a backlight, and is capable of displaying map information generated by the navigation portion 19 and guiding path information to a destination, the received broadcasting frequency transferred from the in-vehicle apparatus 100, a music track number played, music name played, and the like.

Here, the display portions 11 and 131 may employ a flat panel display other than a liquid crystal panel. Examples are organic light emitting display, plasma display panel, cold-cathode flat panel display, or the like.

The operating portion 12 includes a power button 55 (see FIG. 8A) to turn on or off the power of the portable apparatus 10. The touch panel is, for example, disposed on the display screen. When the touch panel is touched by a finger or a dedicated pen, the touched position is detected to determine whether or not there is an input operation. The power button 55 will be described later.

The GPS information receiver 13 includes an antenna and a tuner, and receives the GPS signal from a satellite. Such received GPS signal is output to the navigation portion 19, and the vehicle location is detected based on the GPS signal. Meanwhile, the in-vehicle apparatus 100 is also provided with the GPS information receiver 133. However, when the portable apparatus 10 is attached to the in-vehicle apparatus 100, the location of the vehicle in which the in-vehicle apparatus 100 having the portable apparatus 10 therein is mounted is specified by use of the GPS signal (and the vehicle speed pulse) received by the GPS information receiver 133. When the portable apparatus 10 is used alone, the location thereof is specified by use of the GPS signal received by the GPS information receiver 13.

The speaker 14 is provided for outputting the audio information of the navigation portion 19, and outputs the audio information only when the portable apparatus 10 is detached from the in-vehicle apparatus 100, namely, used alone separately.

The rechargeable battery 15 supplies power to each portion of the portable apparatus 10. When the portable apparatus 10 is attached to the in-vehicle apparatus 100, the power is supplied through the power supply terminals of the connector 30 from the battery of the vehicle and the rechargeable battery 15 is charged by the charge circuit 16. Also, the charge circuit 16 is supplied with the power from the connection terminal through a USB slot 57 (see FIG. 8A), and the rechargeable battery 15 can be charged.

The wireless communication transmitter/receiver 17 sends and receives the voice on communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation portion 19 includes a map information storing portion in which the map information used for navigation acquired from an SD (Secure Digital) card or the USB memory is stored, determines current location information with GPS signal from the GPS information receiver 133 or the GPS information receiver 13, and creates an image for the navigation operation. The created map may be displayed on the display portion 11. When the in-vehicle apparatus 100 and the portable apparatus 10 are connected, the vehicle speed pulse is acquired from the vehicle so that the accuracy of the location detection of the vehicle in which the portable apparatus 10 is mounted in the in-vehicle apparatus 100 can be improved.

Here, the map information may be retained in the portable apparatus 10.

The controller 20 controls each part of the portable apparatus 10. Also, the controller 20 outputs various signals to the in-vehicle apparatus 100 through the connector 30, and controls the portable apparatus 10 based on the various signals input from the in-vehicle apparatus 100. For example, the controller 20 acquires the GPS signal received by the GPS information receiver 133 of the in-vehicle apparatus 100 and the vehicle speed pulse from the controller 140 of the in-vehicle apparatus 100, and outputs the GPS signal and the vehicle pulse to the navigation portion 19. Also, the controller 20 acquires the audio signal input by the microphone 138 of the in-vehicle apparatus 100 from the controller 140 of the in-vehicle apparatus 100, and controls the navigation portion 19 according to the audio signal. That is to say, the navigation portion 19 can be operated in a hands-free manner. The voice on communication over the mobile phone connected to the wireless communication transmitter/receiver 17 is output to an in-vehicle apparatus side through the connector 30, and is caused to output from the speaker 145 of the in-vehicle apparatus 100. The operation signal on the menu screen or content screen displayed on the display portion 11 is output to the controller 140 of the in-vehicle apparatus 100 through the connector 30. The controller 140 controls the radio receiver 134 or the CD player 135 according to the operation signal transmitted from the controller 20 of the portable apparatus 10.

Figure 8A:
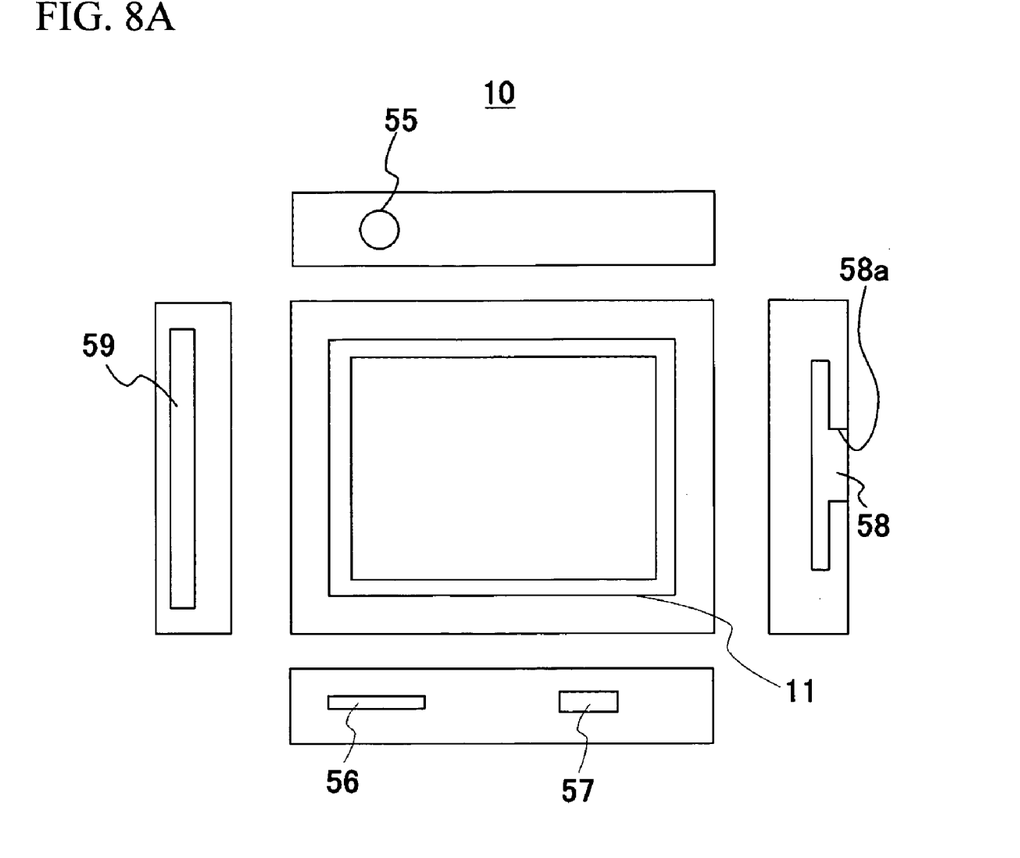
FIG. 8A and FIG. 8B are schematic views of the portable apparatus.
Figure 8B:
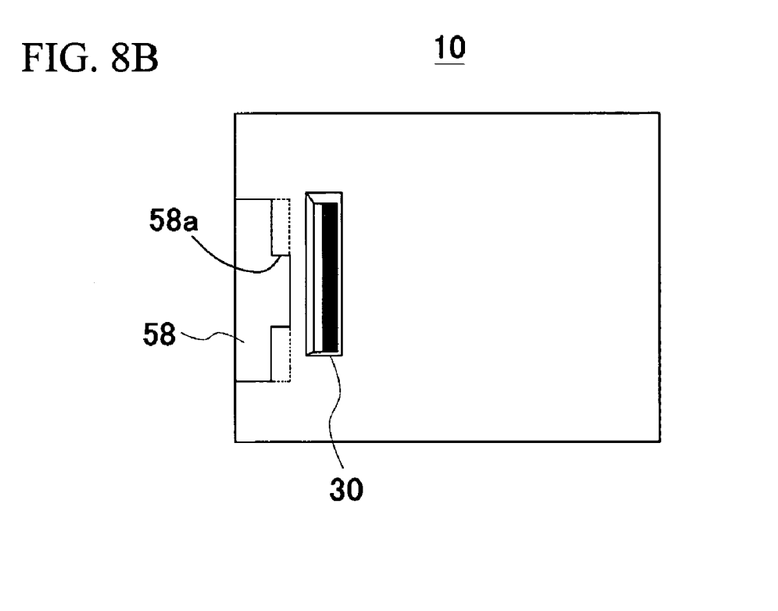

FIG. 8A shows a front view, top view, bottom view, left-side view, and right-side view of the portable apparatus 10. FIG. 8B is a back view of the portable apparatus 10.

The top face of the portable apparatus 10 is provided with the power button 55 for turning on or off the power of the portable apparatus. The bottom face of the portable apparatus 10 is provided with: an SD (Secure Digital) memory card slot 56; and the USB slot 57. By inserting the SD card or the USB memory into the slots, the controller 20 reads out the map information from the SD card or the USB memory and outputs the map information to the navigation portion 19.

The power of the portable apparatus 10 is turned on or off, when the portable apparatus is attached to the in-vehicle apparatus 100. Also, the power is operated on the basis of on or off operation of the power button 55, when the portable apparatus 10 is removed from the in-vehicle apparatus 100 and used alone separately.

Furthermore, on the backside of the portable apparatus 10, there is provided the connector 30 for establishing electrical connection with the in-vehicle apparatus 100.

At an edge portion of the right-side face and that of the back face of the portable apparatus 10, there is provided a latch portion 58 latched with a lock mechanism (not shown) provided at the in-vehicle apparatus 100 side.

The latch portion 58 is defined in a recess shape.

On the left-side surface of the portable apparatus 10, there is provided an engagement portion 59 extending in a vertical direction. The engagement portion 59 is defined in a recess shape.

Next, a description will be given of the housing portion 170 and the CD insertion/ejection slot 180.

As shown in FIG. 3, the housing portion 170 is formed in a recess shape at the front face portion 120, and the CD insertion/ejection slot 180 is defined to extend in a lateral direction at the front face of the in-vehicle apparatus main body 110. Also, the front face portion 120 is tiltably supported to move between a state of covering the front face of the in-vehicle apparatus main body 110 and another state of exposing at least a portion of the front face of the in-vehicle apparatus main body 110.

In this manner, the housing portion 170 and the CD insertion/ejection slot 180 are not located in an identical plane. Accordingly, if the housing portion 170 and the CD insertion/ejection slot 180 are located in an identical plane, it is necessary to arrange the housing portion 170 and the CD insertion/ejection slot 180 not to interfere with each other (for example, the housing portion 170 is arranged above or arranged below), thereby leading to the possibility of increasing the size of the in-vehicle apparatus.

However, by arranging the front face portion 120 at the front face of the in-vehicle apparatus main body 110, like the in-vehicle apparatus 100 employed in the present exemplary embodiment, the space in a depth direction of the in-vehicle apparatus 100 can be effectively utilized, thereby reducing the size of the in-vehicle apparatus 100 in a vertical direction and in a lateral direction.

In particular, even in a case where the housing portion 170 occupies a great portion of the front face portion 120, it is possible to suppress the increase in size of the in-vehicle apparatus 100. Accordingly, even if the size of the portable apparatus 10 is great, the portable apparatus 10 can be detachably retained and the size of the in-vehicle apparatus 100 can be reduced.

In addition, as shown in FIG. 3, the CD insertion/ejection slot 180 is formed at a position to be firstly exposed at the front face of the in-vehicle apparatus 100, when the front face portion 120 is tilted. That is to say, the CD insertion/ejection slot 180 is arranged at an upper portion of the front face side of the in-vehicle apparatus main body 110, the upper portion starting being exposed when the front face portion 120 shifts from a standing state shown in FIG. 1A to a tilting state shown in FIG. 3. This minimizes the movement of the front face portion 120, and permits the CD insertion/ejection slot 180 to be exposed. This makes the insertion and ejection of a CD easier.

Further, as described above, since the portable apparatus 10 is provided with the display portion 11, the in-vehicle apparatus 100 can be downsized without downsizing the portable apparatus 10. Accordingly, the display portion 11 of the portable apparatus 10 need not be reduced in size. This can secure the visibility of the display portion 11.

Also, since the display portion 11 displays a navigation image, as shown in FIG. 7, the degradation of the visibility of the navigation image caused by the reduction in size of the in-vehicle apparatus 100 can be prevented.

Also, as described above, the front face portion 120 is tiltably supported and stoppable at a given position. With this configuration, when the portable apparatus 10 is attached to the housing portion 170, the display portion 11 of the portable apparatus 10 can be retained at a position where the display portion 11 is easily visible, by tilting the front face portion 120.

The description has been given of the in-vehicle system 1 composed of the in-vehicle apparatus 100 and the portable apparatus 10; however, the present invention is not limited to the in-vehicle apparatus.

Furthermore, the portable apparatus 10 may be composed of a mobile telephone with the navigation functionality or a personal digital assistance (PDA). For example, if it is difficult to electrically connect a mobile telephone with the navigation functionality and an electronic apparatus, the electrical connection may be established by wireless communication (an example is Bluetooth) and the mobile telephone may be housed in the electronic apparatus as a mechanical structure.

Furthermore, instead of the CD insertion/ejection slot 180 and the CD player 135, there may be provided an insertion/ejection slot and a player thereof for another memory media such as MD (Mini Disk), DVD (Digital Versatile Disk), SD memory card, or the like, and there may also be provided insertion/ejection slots and players for multiple types of memory media.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

What is claimed is:

1. An electronic apparatus comprising:
a main body; and
a front face panel movably supported to cover a front face of the main body or to expose at least a portion of the front face thereof,
wherein:
the front face panel is provided with a housing portion detachably retaining a portable apparatus that is movable with the front face panel;
the front face side of the main body is provided with an insertion/ejection slot for inserting or ejecting a memory medium; and
the portable apparatus includes a display portion for displaying a navigation image and the portable apparatus is independently operable while detached from the housing.

2. The electronic apparatus as claimed in claim 1, wherein the insertion/ejection slot is arranged at a position to be firstly exposed at the front face of the main body.

3. The electronic apparatus as claimed in claim 1, wherein the front face panel is tiltably supported and stoppable at a given position.

4. An electronic system comprising:
a portable apparatus; and
an electronic apparatus detachably retaining the portable apparatus,
the electronic apparatus comprising:
a main body; and
a front face panel movably supported to cover a front face of the main body or to expose at least a portion of the front face thereof,
wherein:
the front face panel is provided with a housing portion detachably retaining a portable apparatus that is movable with the front face panel;
the front face side of the main body is provided with an insertion/ejection slot for inserting or ejecting a memory medium; and
the portable apparatus is provided with a display portion for displaying a navigation image and the portable apparatus is independently operable while detached from the housing.

5. An electronic apparatus comprising:
a main body; and
a front face panel movably supported to cover a front face of the main body or to expose at least a portion of the front face thereof,
wherein:
the front face panel is provided with a housing portion detachably retaining a portable apparatus that is movable with the front face panel;
the front face side of the main body is provided with an insertion/ejection slot for inserting or ejecting a memory medium;
the insertion/ejection slot is arranged at a position to be firstly exposed at the front face of the main body and the insertion/ejection slot is separate from the front face panel; and
the portable apparatus includes a display portion for displaying a navigation image and the portable apparatus is independently operable while detached from the housing.

* * * * *